J. T. SIMPSON.
FURNACE GRATE AND VAPORIZER CONSTRUCTION.
APPLICATION FILED SEPT. 23, 1916.
1,313,127.
Patented Aug. 12, 1919.
4 SHEETS—SHEET 4.
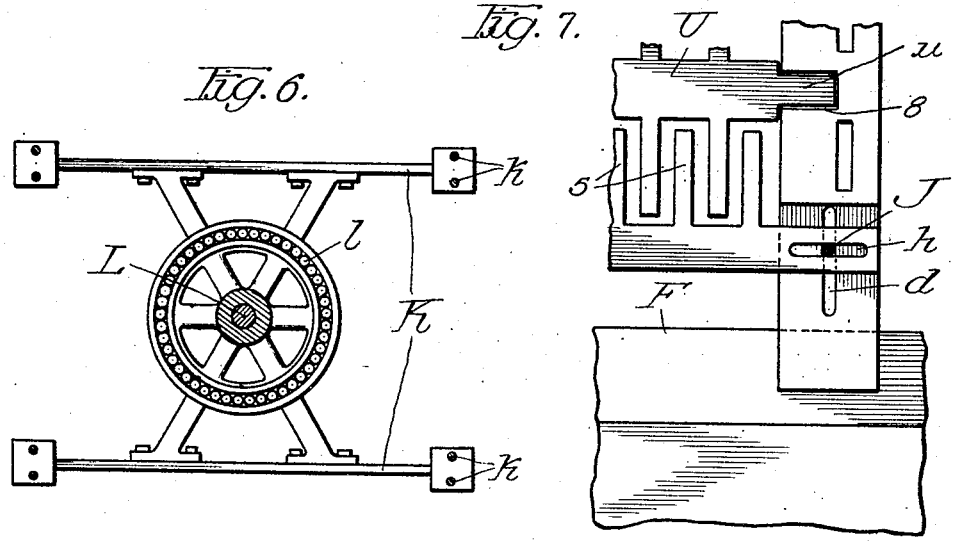
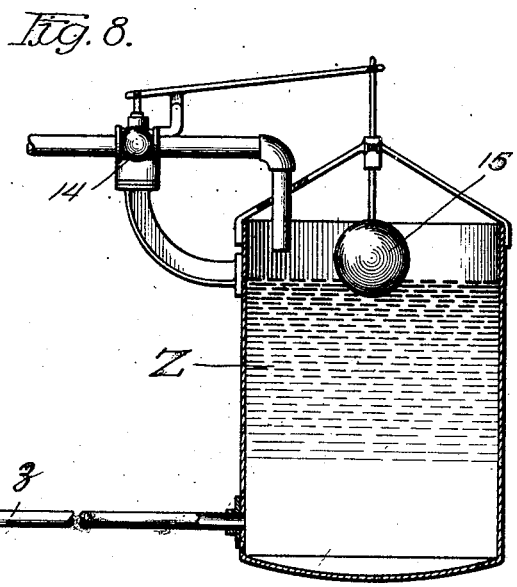
Witnesses:
Inventor:
John T. Simpson
By Arthur F. Durand
Atty.

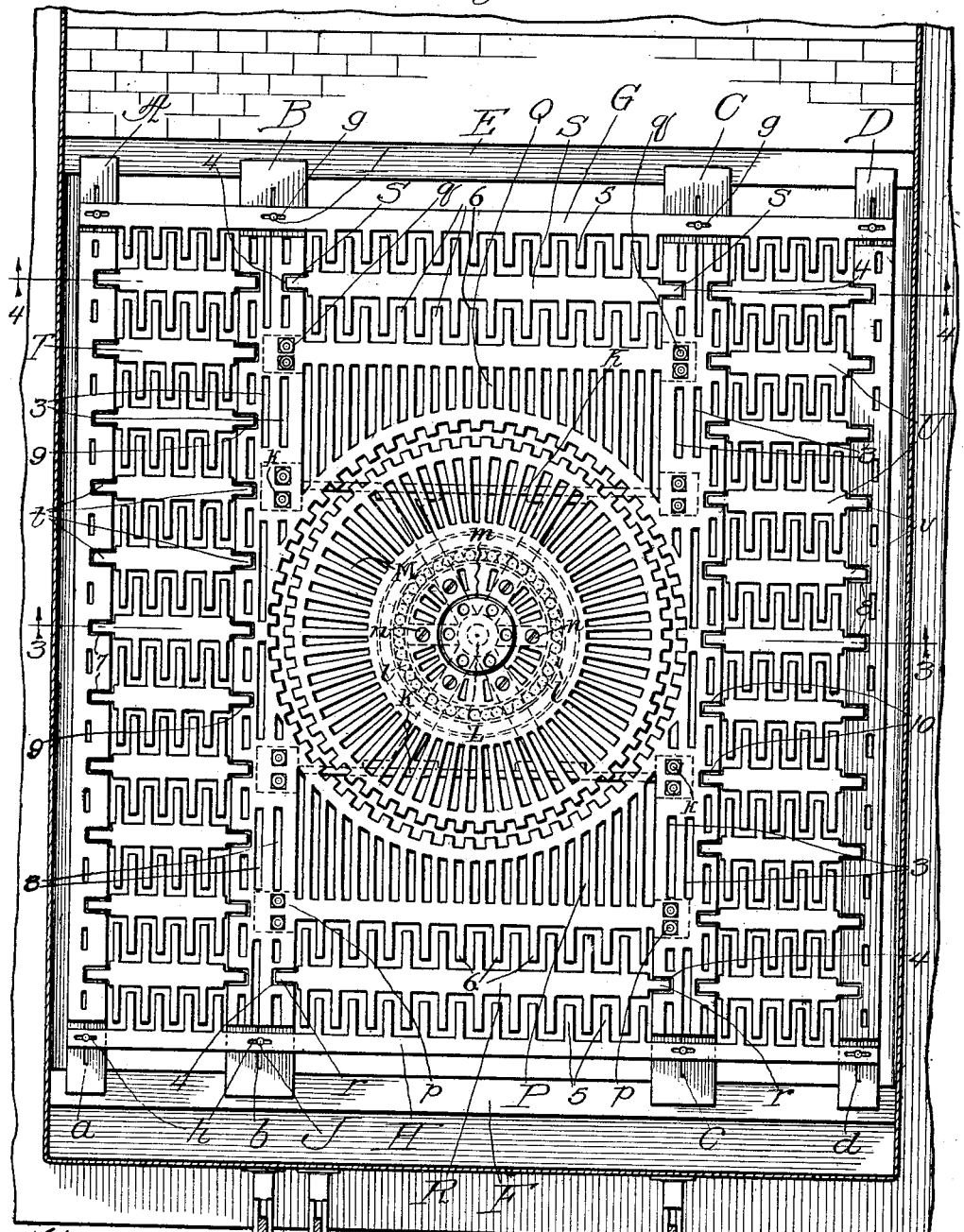

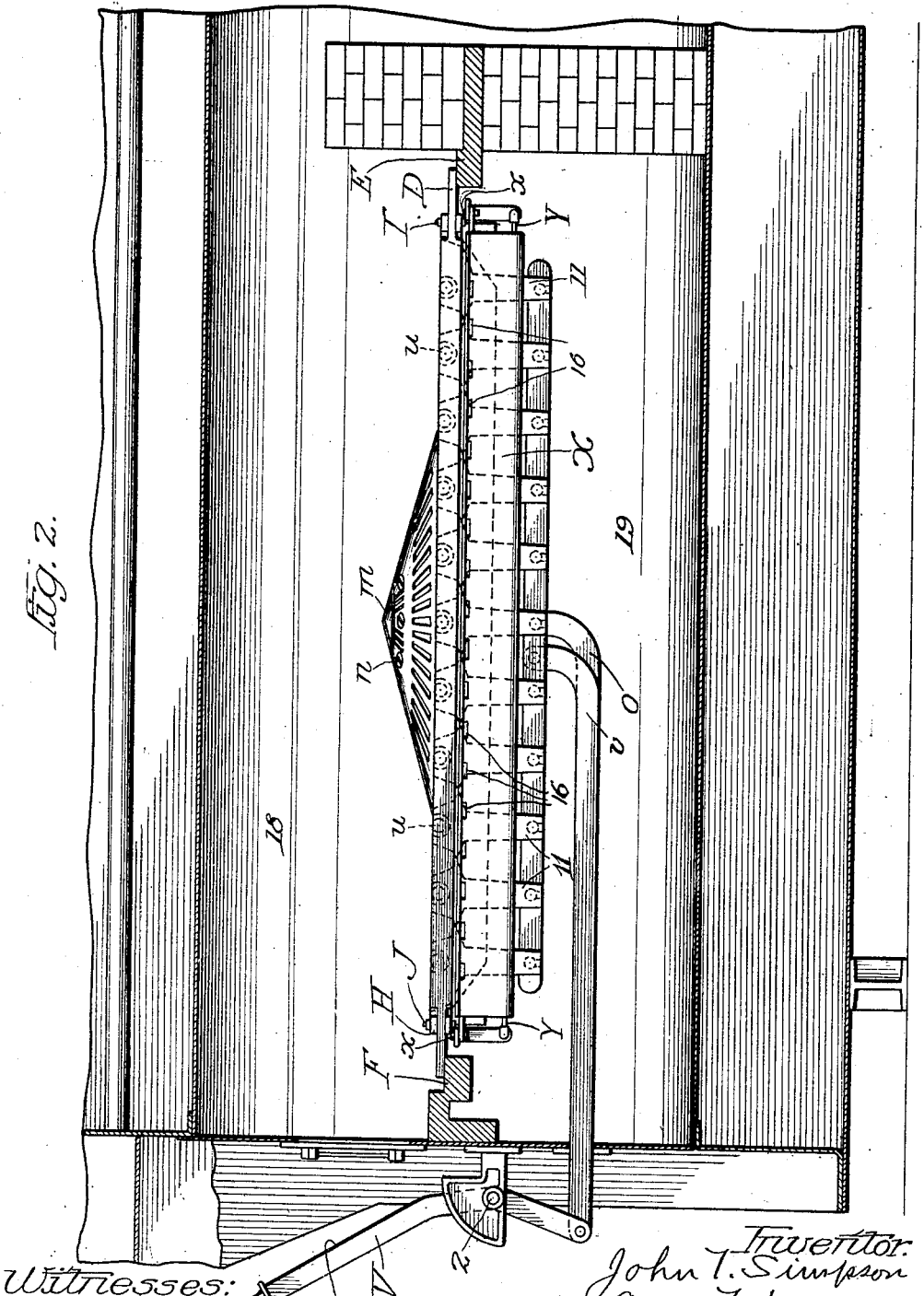

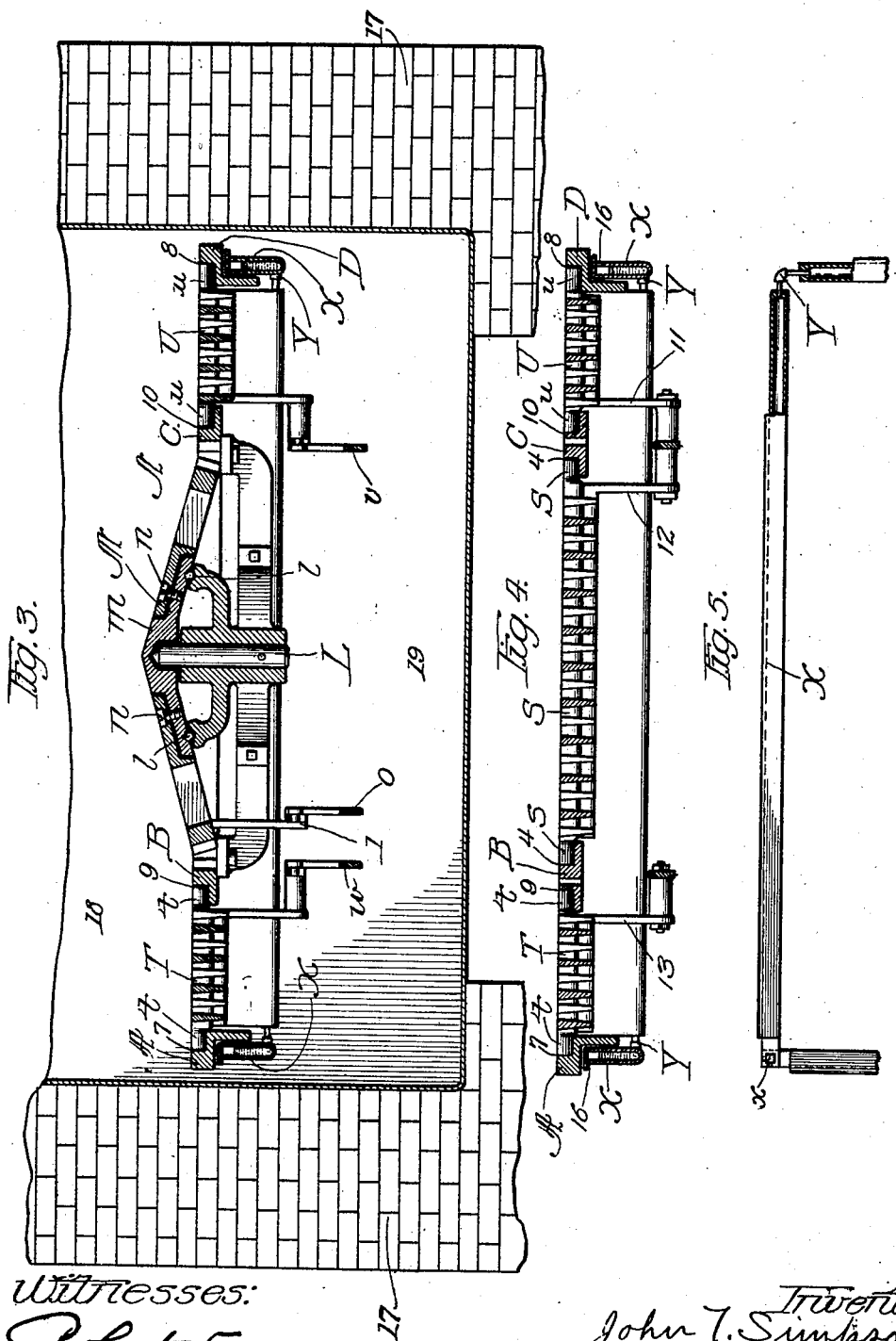

UNITED STATES PATENT OFFICE.

JOHN T. SIMPSON, OF CHICAGO, ILLINOIS, ASSIGNOR TO ECONOMY SALES COMPANY, OF CHICAGO, ILLINOIS, A CORPORATION OF ILLINOIS.

FURNACE-GRATE AND VAPORIZER CONSTRUCTION.

1,313,127. Specification of Letters Patent. Patented Aug. 12, 1919.

Application filed September 23, 1916. Serial No. 121,709.

*To all whom it may concern:*

Be it known that I, JOHN T. SIMPSON, a citizen of the United States of America, and resident of Chicago, Cook county, Illinois, have invented a certain new and useful Improvement in Furnace-Grate and Vaporizer Construction, of which the following is a specification.

My invention relates to furnace grates in general, but more particularly to those of that kind in which a central section, which is movable, is surrounded by other grate sections.

Generally stated, one object of my invention is to provide an improved grate construction of this general character in which the central section is oscillatory, and in which the central section is surrounded by stationary grate sections, movable grate sections being arranged outside of the stationary sections, thereby to effect the combustion of the fuel in a manner which will be efficient and effective for any desired purpose. Another object is to provide an improved grate construction for making water gas.

It is also an object to provide certain details and features of construction and combinations tending to increase the general efficiency and desirability of a furnace grate of this particular construction.

To the foregoing and other useful ends, my invention consists in matters hereinafter set forth and claimed.

In the accompanying drawings:—

Figure 1 is a plan of a furnace grate embodying the principles of my invention.

Fig. 2 is a side elevation of the structure shown in Fig. 1.

Fig. 3 is a transverse section on line 3—3 in Fig. 1.

Fig. 4 is a transverse section on line 4—4 in Fig. 1.

Fig. 5 is a detail view illustrating the construction of the water-receptacle which extends around the entire grate structure.

Fig. 6 is a plan of the center frame which supports the oscillatory center section of the grate.

Fig. 7 is an enlarged detail plan view of one corner portion of the grate structure.

Fig. 8 is a sectional view illustrating a form of apparatus for automatically supplying water to the water-receptacle.

As thus illustrated, my invention comprises the horizontal and longitudinally extending frame-bars or stationary grate-members A, B, C and D which rest on the walls E and F at their opposite ends, said walls being of any suitable character. Transverse end-bars G and H connect the bars A, B, C and D together, these end-bars being provided with slots $g$ and $h$, respectively, and bolts I and J extending through these slots and through the longitudinal slots $a$, $b$, $c$ and $d$ in the longitudinal bars, in the manner shown more clearly in Fig. 7, whereby all of these bars can expand and contract easily without distorting the structure. The stationary frame K, shown more clearly in Fig. 6, is bolted at $k$ to the under sides of the longitudinal bars B and C, and is provided with a vertical center-post or pivot L which forms the axis of the ball-bearing $l$, the latter being of any suitable character. The center grate-section M is shaped like an obtuse cone, being composed of a middle portion $m$ having outer removable sections N secured by bolts $n$ thereto. The portion $m$ is supported by the ball-bearing $l$, so that no weight is supported by the upper end of the post or pivot L, the latter serving merely to center the grate section M in the desired manner. The hand-lever O is connected by a link $o$ with an arm 1 which depends from one side of the grate section M, said hand-lever being suitably pivoted to operate about the horizontal axis 2 at the front of the furnace. With this arrangement, and by vibrating the hand-lever O, the center grate section M is oscillated about a vertical axis. The stationary bars B and C are provided with openings or slots 3, so that these bars or stationary members serve as stationary grate sections, being disposed at opposite sides of the central oscillatory section N, and in the plane of the lower edges of the latter. The stationary grate sections P and Q are supported transversely of the grate and connected to the bars B and C at $p$ and $q$, respectively, and are provided with curved and toothed inner edges which are disposed at the base of the conical oscillatory center section M, whereby the latter is entirely surrounded by stationary grate sections, and whereby there are no rocking grate sections or any movable grate sections at the base of the oscillatory center section. It will be seen, however, that the transverse rocking grate bars R and S have their end-bearings or trunnions $r$ and $s$, which may be of any suitable shape, located to turn and rock in recesses 4 on the longitudinal bars B and C. These bars have their teeth arranged to extend between the teeth 5 on the cross-bars G and H, and also between the teeth 6 of the stationary grate sections P and Q, whereby transverse rocking grate sections are provided in front and rear of the stationary grate sections which are disposed immediately in front and in rear of the oscillatory center grate section. It will also be seen that the shorter transverse rocking grate bars T and U have their end-bearings or trunnions $t$ and $u$ arranged to turn or rock in the recesses 7 and 8 on the outside sills or longitudinal bars A and D, and in the recesses 9 and 10 formed in the bars B and C, in a manner that will be readily understood. Thus, the space between the longitudinal members A and B is occupied by the transversely arranged rocking grate bars T, while the similar space between the longitudinal members C and D is occupied by the rocking grate bars U, whereby rocking grate sections are provided at opposite sides of the stationary grate sections. The pivoted hand-lever V is connected by a link $v$ with the depending arms 11 on the grate bars U, and also with the depending arm 12 on one end of the rocking grate bar S, whereby the operation of this hand-lever causes the grate bars U and S to rock about horizontal axes in the bearings provided for this purpose, as previously described. Another pivoted hand-lever W is connected by a link $w$ with the depending arms 13 on the rocking grate bars T, and with a similar arm on one end of the rocking grate bar R, whereby the operation of this lever serves to rock all of said grate bars.

Thus, the oscillatory center section M is controlled by the hand-lever O, in the manner explained, while the rocking grate bars U and S are controlled by the hand-lever V, and the grate bars T and R are controlled by the hand-lever W, in a manner that will be readily understood. The stationary grate bars or grate sections are disposed at the base of the oscillatory center section, and completely surround the latter, and the rocking grate bars or grate sections are disposed outside of said stationary grate bars or grate sections, in the horizontal plane thereof, so that a portion of the burning fuel is supported on stationary grate sections occupying an area between the oscillatory center section and the outer rocking sections. Furthermore, the center section M does not rotate, but is merely oscillatory about a vertical axis.

A rectangular water-receptacle or vaporizer X extends around the entire grate structure, in the manner shown in Figs. 3 and 4, this water-receptacle consisting of four straight sections connected together at their ends, and at the corners of the grate structure, by bolts $x$, and end portions of the water-receptacle sections being slotted to permit them to slide on said bolts, thereby providing for expansion and contraction. The outer rectangular frame of the grate is formed by the longitudinal members A and D and the cross-bars G and H, and each member and each cross-bar has a section of said water-receptacle allotted thereto. It will also be seen that the said water-receptacle sections are connected at their ends by suitable tubes Y, whereby the water may circulate from one section to the other. A water-tank Z is connected by a pipe $z$ with the said water-receptacle X, as shown more clearly in Fig. 8, and is provided with an inlet-valve 14 which is automatically controlled by a float 15 within the tank, so that the latter is kept full of water. The flat box-like members which thus form the vaporizer have their outer flat walls provided with vents 16 for the steam, these outlets being disposed along the upper edge of each member. The frame of the grate structure overhangs the tops of these box-like members, and extends downwardly inside thereof, close to the inner walls of the vaporizer, as shown in the drawings. As fast as the water evaporates, the water-receptacle has a fresh supply of water from the tank Z, in a manner that will be readily understood. In this way, the rim or outer frame-portion of the grate structure is provided with a steam or vapor generating receptacle. The exact manner in which the vaporizer is mounted on the rim or outer frame of the grate is unimportant, and may be of any suitable character, such as bolts, screws or hooks or other common or ordinary means, for the essential feature is, as stated, that the rim or outer frame portion of the grate structure is provided with a vaporizer, and that the grate is supported by means entirely distinct from and independent of said vaporizer, and with this arrangement the vaporizer does not support the grate, and the steam generated will escape through the vents 16 into the ash-pit below the grate, and will then be drawn up through the grate by the draft of the furnace. The walls 17 of the furnace form the combustion-chamber 18 above the grate and the ash-pit 19 below in which the vaporizer is inclosed. It will be understood, of course, that the tube-connections Y are of such character that they will yield slightly, so that the expansion and contraction of the sections X will be taken care of in the desired manner. Also, the vaporizer thus shown and described is adapted for removal upwardly with the grate structure, from the supporting means F and E, being associated therewith, but could be made detachable without disturbing the grate, as the vaporizer does not support the grate in any way or to any extent. The steam or water vapor drawn up through the grate will pass through the burning fuel and be converted into water gas in the well-known manner. For this purpose, coke is ordinarily employed as the fuel, and in this way the grate can be used in a furnace for any ordinary purpose, and at the same time water gas will be produced. As the bars E and F support the removable grate structure, it is obvious that the vaporizer does not sustain any part of the weight of the grate structure, and that the vaporizer can be omitted from the structure without depriving the grate of its support and, obviously, the vaporizer comprising the sections X can be mounted on the removable grate structure or can be supported on the stationary end bars E and F of the grate structure in such a way that the vaporizer itself is readily removable from the furnace.

In this application the claims cover the construction relating to the furnace grate and vaporizer construction, while the claims for the grate construction are in a divisional application Serial No. 250,467, filed August 19, 1918, for furnace grate.

What I claim as my invention is:—

1. A furnace grate comprising grate sections, an outer rectangular frame for inclosing and supporting the sections, forming the top of the grate at the outer edges thereof, means to support said frame, a water-receptacle extending along said frame, so that the outer frame portion of the grate structure is provided with a vaporizer which forms no portion of said means to support the grate, the outer wall of said receptacle having outlets for the steam, means to supply water to said receptacle, and means forming a combustion-chamber above the grate and an ash-pit below, said vaporizer being disposed under the grate and in the upper portion of the ash-pit.

2. A furnace grate comprising grate sections, an outer rectangular frame for inclosing and supporting the sections, forming the top of the grate at the outer edges thereof, means to support said frame, a water-receptacle extending along said frame, so that the outer frame portion of the grate structure is provided with a vaporizer which forms no portion of the means to support the grate, the outer wall of said receptacle having outlets for the steam, said receptacle having outlets for the steam, said receptacle comprising sections which are adjustably connected together at the corners of said frame, and means forming a combustion-chamber above the grate and an ash-pit below, said vaporizer being disposed under the grate above the ash-pit.

3. A furnace grate comprising grate sections, an outer rectangular frame for inclosing and supporting the sections, forming the top of the grate at the outer edges thereof, means to support said frame, a water-receptacle extending along said frame, so that the outer frame portion of the grate structure is provided with a vaporizer which forms no portion of the means to support the grate, the outer wall of said receptacle having outlets for the steam, means to automatically supply water to said receptacle, and means forming a combustion-chamber above the grate and an ash-pit below, said vaporizer being disposed under the grate and in the upper portion of the ash-pit.

4. A furnace grate comprising grate sections, an outer rectangular frame for inclosing and supporting the sections, forming the top of the grate at the outer edges thereof, means to support said frame, a water-receptacle disposed under the outer edge of the grate and extending along said frame, so that the outer frame portion of the grate structure is provided with a vaporizer which forms no portion of the means to support the grate, the outer wall of said receptacle having outlets for the steam, means to automatically maintain the water at a certain level in said receptacle, and means forming a combustion-chamber above the grate and an ash-pit below, said vaporizer being disposed under the grate and in the upper portion of the ash pit.

5. The combination of the seven instrumentalities, to-wit:—(1) a plurality of movable furnace-grate sections, (2) a stationary frame to support said grate sections, forming part of the grate structure, (3) a plurality of water-receptacles associated with said frame, below the top of the grate structure, forming a vaporizer having outlets for the steam, (4) connections between said receptacles to permit relative movement between them to compensate for expansion and contraction of the structure, and to circulate the water from one receptacle to another, (5) means to supply water to the sectional vaporizer thus formed by said receptacles, (6) means to support said frame in position for the operation of the vaporizer thus associated therewith, so that the vaporizer sustains no part of the weight of the grate structure, and (7) means to form a combustion chamber above said grate, and an ash pit inclosing said vaporizer.

6. A structure as specified in claim 5, said receptacles being flat box-like members disposed in vertical planes, forming a rectangular frame the sides of which are movably connected at the corners thereof, with said outlets disposed at the upper edge of the flat outer wall of each box-like member, and with said frame overhanging the top of each member and extending downwardly inside thereof.

Signed by me at Chicago, Illinois, this 5th day of September, 1916.

JOHN T. SIMPSON.

Copies of this patent may be obtained for five cents each, by addressing the "Commissioner of Patents, Washington, D. C."